United States Patent [19]

Leach et al.

[11] Patent Number: 5,490,062

[45] Date of Patent: Feb. 6, 1996

[54] REAL-TIME NEURAL NETWORK EARTHQUAKE PROFILE PREDICTOR

[75] Inventors: Richard R. Leach; Farid U. Dowla, both of Castro Valley, Calif.

[73] Assignee: The Regents of the University of California, Oakland, Calif.

[21] Appl. No.: 241,060

[22] Filed: May 11, 1994

[51] Int. Cl.$^6$ ...................................................... G06F 15/18
[52] U.S. Cl. ............................................ 364/421; 395/929
[58] Field of Search ............................... 364/421; 395/929

[56] References Cited

U.S. PATENT DOCUMENTS

| 5,181,171 | 1/1993 | McCormack et al. | 364/421 |
| 5,265,192 | 11/1993 | McCormack | 364/421 |
| 5,373,486 | 12/1994 | Dowla et al. | 364/421 |

OTHER PUBLICATIONS

Bitto et al., "Seismic Event Discrimination Using Neural Networks", 23rd Asilomar Conference on Signals, Systems and Computers, v. 1 Nov. 1, 1989, pp. 326–330.

Bitto, "Seismic Event Discrimination Using Neural Networks", Abstract of Thesis, Dec. 1989.

*Primary Examiner*—Donald E. McElheny, Jr.
*Attorney, Agent, or Firm*—Henry P. Sartorio; John P. Wooldridge

[57] ABSTRACT

A neural network has been developed that uses first-arrival energy to predict the characteristics of impending earthquake seismograph signals. The propagation of ground motion energy through the earth is a highly nonlinear function. This is due to different forms of ground motion as well as to changes in the elastic properties of the media throughout the propagation path. The neural network is trained using seismogram data from earthquakes. Presented with a previously unseen earthquake, the neural network produces a profile of the complete earthquake signal using data from the first seconds of the signal. This offers a significant advance in the real-time monitoring, warning, and subsequent hazard minimization of catastrophic ground motion.

27 Claims, 10 Drawing Sheets

$e_{01}$ THRU $e_{0160}$ OUTPUTS

REAL-TIME NEURAL NETWORK EARTHQUAKE PROFILE PREDICTOR

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to earthquake early warning, and more specifically, to the method of using a neural network to produce a complete earthquake profile prior to the actual arrival of strong ground motion.

2. Description of Related Art

U.S. Pat. No. 5,270,649 is directed to the prediction of earthquakes by measuring a magnetic spin resonance of the earth's crust. When the value of an alarm signal exceeds a threshold value, an alarm is generated. U.S. Pat. No. 4,980,644 is directed to an earthquake predicting magnetometer having a compass assembly with a graduated dial and an adjustably positionable magnet assembly having magnetic poles oriented opposite the direction markings on the compass dial. The patent discloses that when the magnetosphere of the earth weakens prior to a major seismic event, the compass needle will point to the south on a graduated scale of the dial, indicating an imminent quake of large magnitude.

U.S. Pat. No. 4,884,030 relates to a system for acquisition and separation of the effects of simultaneous sources of electromagnetic fields to predict earthquakes. The patent discloses an array of pickups connected to registration means where the minimum number of pickups per array is equal to 2s+2, where s is equal to a number of simultaneous sources to be analyzed. U.S. Pat. No. 4,837,582 is directed to the detection of electromagnetic waves generated by the earth's crust under strain. An antenna is located in the earth to receive preearthquake electromagnetic waves generated prior to the occurrence of an earthquake.

U.S. Pat. No. 4,628,299 discloses a seismic warning system the monitors the ambient broadband radio frequency field strength from broadcast stations. The system indicates a warning if the field strength drops significantly. U.S. Pat. No. 4,612,506 is directed to a method of forecasting earthquakes as a function of transient variations in electric earth currents. U.S. Pat. No. 4,297,690 is directed to an earthquake alarm system that detects lateral impulse movements of structures and generates an audible sound when movement exceeds a limit. U.S. Pat. No. 4,170,776 describes a system for detecting earth crustal deformations using an RF interferometer technique.

It is desirable to use the first seconds of seismic activity from an emerging earthquake to predict the size and duration of the impending S, Rayleigh, and Love waves. These later arriving waves produce both horizontal and vertical ground motion and tend to cause the greatest damage to structures. An accurate prediction of the later arriving energy will provide a complete profile of the impeding earthquake which can include a magnitude prediction, onset time, epicentral distance, earthquake azimuth, and duration of heavy shaking. The system could be implemented in electronic hardware and would be useful as a single station warning system or as an element in a distributed system. The present invention provides such a system.

SUMMARY OF THE INVENTION

This invention uses the first few seconds of the seismic activity from an emerging earthquake to predict the coming S, Rayleigh, and Love waves. These later arriving waves produce both horizontal and vertical ground motion and tend to cause the most damage to structures. One of these later arriving waves is a regional surface wave called the Lg wave. The Lg wave is composed of a family of trapped waves which travel through the earth's low velocity crust. The crust acts as a waveguide and provides little attenuation loss. In addition, these waves interact as they propagate and often produce considerable amplification of ground motion near the surface. An accurate prediction of this later arriving energy provides a profile of the impending ground motion, including a magnitude prediction and the onset and duration of the heavy shaking.

DETAILED DESCRIPTION OF THE INVENTION

During the training phase, a back propagation artificial neural network (ANN) is presented with information from hundreds of earthquakes. This is typically done in a workstation environment using stored seismograms from a database such as the United States Geological Society (USGS). The earthquakes are preprocessed by filtering and envelope detecting of the seismic signal. The network is presented time series and frequency information from these signals as input, and produces an output. An error is calculated between the ANN output and the true seismic signal. The internal weights of the ANN are adjusted to reduce this error. This process is iterated many times until the error is reduced to a level where the ANN can generalize sufficiently to produce accurate output for previously unseen input. At this time, the ANN is trained and the "knowledge" is stored in the internal weights. This weight information is saved for the feed forward or testing phase.

The testing phase uses a three component seismometer, accelerometer, or geophone. These devices are powered appropriately and their output is amplified to provide an analog input to three channels of a analog-to-digital (A/D) converter board. The information from the sensors can be transmitted to the A/D board either directly through a dedicated wire, or a wireless link may be used. In this manner, the east-west, north-south, and up-down ground motion information is passed to the A/D board.

The A/D board resides externally, or inside a personal computer (IBM, Macintosh, or other). An event detection algorithm is performed and when an event is detected, the incoming seismic signal is preprocessed in the same manner as described above. A feed forward neural network has been previously set up using the weight information described above. In this manner, the ANN, when presented with the first seconds of the seismogram, will produce a complete earthquake profile. At this time, a decision analysis algorithm in implemented. A simple example is a warning level above which indicates the onset time, during which indicates the duration and a scaled magnitude of the earthquake. For remote applications, the feed forward phase can be implemented in low power digital electronic very large scale integration (VLSI) hardware.

Figure 1A:
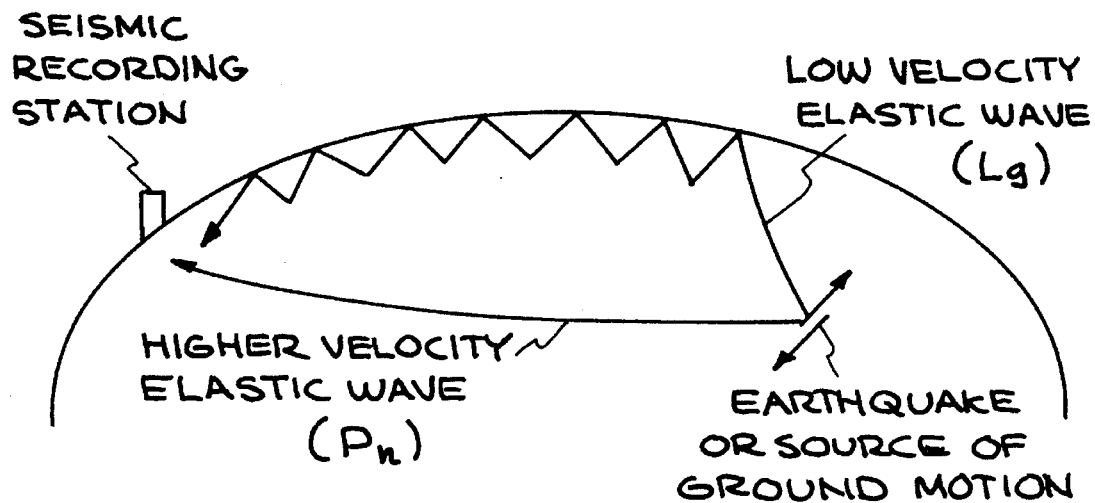
FIG. 1A illustrates different elastic wave paths.
Figure 1B:
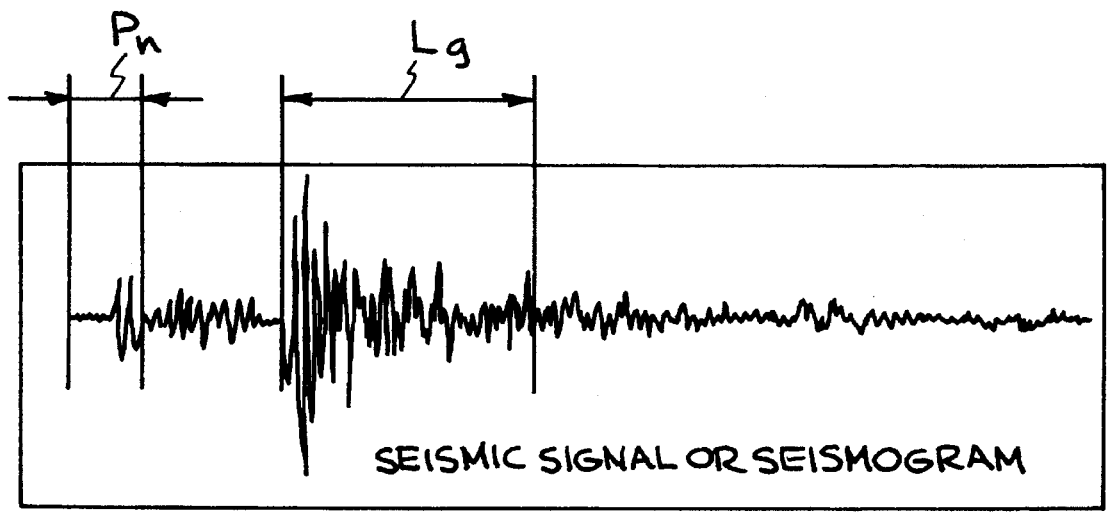
FIG. 1B is a seismogram of low and high velocity elastic waves.

Of the elastic waves that travel from the earthquake epicenter or source, the body waves propagate within a body of rock and appear in the first portion of a seismic signal. The faster of these body waves is called the primary or P-wave. FIG. 1A illustrates different elastic wave propagation paths. FIG. 1B is a typical seismogram. This P-wave segment is the most direct arrival and is rich in information about the earthquake source function and the characteristics of the elastic wave's propagation path. For instance, the source azimuth is obtained from the P-wave segment of a three-component seismogram signal. Also, higher frequencies tend to damp out as the wave propagates and thus the frequency content of the P-wave indicates the source distance. Amplitude variations will produce an estimate of earthquake magnitude.

Characterizing the surface waves shortly after the onset of an earthquake is the key to an optimal warning system. Present day warning systems typically wait for ground motion acceleration to exceed a preset threshold. In order to avoid high false alarm rates, this threshold is generally set to trigger on the later arriving surface waves. In many instances this leaves little or no real-time warning at the detection site. Depending on the distance between the earthquake epicenter and the seismograph, the first arriving energy could provide on the order of one to tens of seconds of warning at the detection site. The length of warning time varies because the elastic wave energy travels at different speeds as a function of propagation path. Typically, the first phase energy, or Pn body wave, propagates from 6 to 8 km/sec. The Lg wave propagates from 2.9 to 3.8 km/sec. As an example, using a Lg velocity of 3 km/sec and a Pn velocity of 8 km/sec, at a an epicentral distance of 20 km from the detection site, the Lg effects will be felt over 6 sec after the onset of the earthquake. If the detection algorithm is designed to provide the entire earthquake signal profile 5 sec after the onset of the earthquake, about 1 sec of warning will be available. At a distance of 200 km, the warning time increases to about 55 sec.

Figure 2:
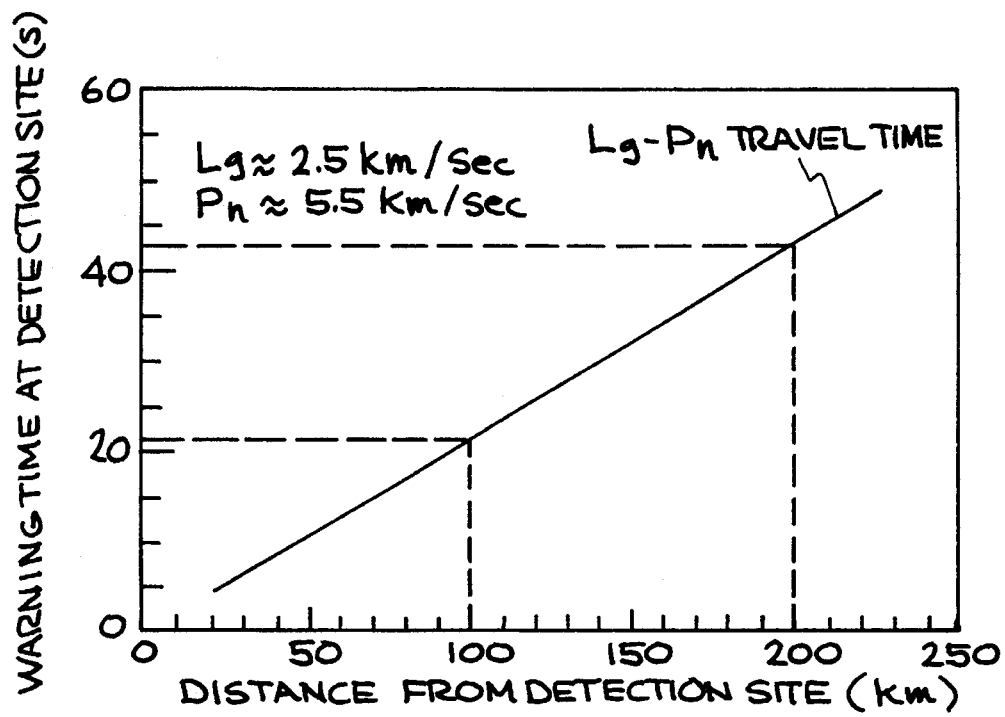
FIG. 2 graphs warning time as a function of distance.

FIG. 2 illustrates the $L_g-P_n$ warning times for varying distances from the earthquake source. S, Rayleigh, and Love waves tend to do the most damage. Warning times for these waves vary with respect to distance. In some instances, even one second of warning can be extremely valuable. On Jun. 7, 1975, a 5.3 magnitude earthquake shook northern California's Humboldt nuclear power plant from an epicentral distance of 25 km. Though there was no ensuing structural damage from this earthquake, future events like these could be profiled in real-time, thus providing an opportunity for either partial system shutdown or some other safety procedure to minimize the risk. Safe operation of hospitals and schools could also be improved, as well as different types of transportation systems ranging from trains, to aircraft, or even to spacecraft. Numerous companies and government agencies, whose operation, if disrupted by a catastrophic event such as an earthquake, might result in a significant loss of property or lives, would also benefit. Mass production of these warning devices based on neural network technology coupled with home computers could even reach households in high risk areas, providing automatic gas and electrical cutoff, as well as audible warning.

A neural network was trained with 50 earthquake seismic signals such that when presented with the first 5 seconds of a previously unseen earthquake seismic signal, the profile of the complete seismogram was produced. The neural network "learned" the nonlinear relationship between the source and path characteristics of body waves (the P wave in particular) and later arriving elastic waves of an earthquake seismic recording. Minimally, the output of the system described here will provide a time series profile from which three vital parameters can be derived: the time until strong shaking starts, the magnitude of the shaking, and the duration of the shaking. A successful neural network based algorithm is implemented in digital electronic hardware for a single-station warning system or as an element in a distributed warning system.

The theoretical basis of our method is described by presenting a simplified linear system model. The earthquake source function is represented by s(t). Considering the linear propagation case, we can represent the received P-wave signal or p(t) by the convolution, $$p(t)=s(t)*h_p(t), \qquad (1)$$

where $h_p(t)$ represents the propagation Green's function (impulse response) for the P-wave segment in the seismogram. Similarly, for the segment of the seismogram following the initial P wave, or c(t), we can write, $$c(t)=s(t)*h_c(t), \qquad (2)$$

where $h_c(t)$ represents the Green's function of the post-P-wave propagation waveform. From equations (1) and (2), it can be shown that, $$c(t)=p(t)* h_p^{-1}(t)* h_c(t)=p(t)* g(t), \qquad (3)$$

where $$g(t)=h_p^{-1}(t)*h_c(t), \qquad (4)$$

and $$h_p^{-1}(t)* h_p(t)=1. \qquad (5)$$

From the above, if it is possible to approximate g(t) from p(t) for many earthquakes, or if it is possible to associate classes of g(t)'s to p(t)'s, then, from equation (3), we can estimate c(t), the post-P-wave signal, from p(t), the P-wave signal. By looking at p(t) for many different earthquakes, the backpropagation network learns a general rule for equation (4) and is able to solve, within some system error, for c(t) in equation (3) given a previously unseen p(t). In general, artificial neural networks (ANNs) have been successfully used to develop nonlinear, nonparametric, calibration systems, as well as signal discriminators from ground motion signals. They also have been used to do real-time classification of signals from three-component seismic sensors as well as class identification of seismic activity. In addition, the results from a neural network showed that the first few seconds of a seismic signal from a nuclear explosion can be used to predict the magnitude of that explosion. Since the ultimate goal of this work is to develop a system for detection and early warning of earthquakes, a neural-network-based system is a good choice, not only because of its successful heritage, but also because of its speed and simplicity of implementation.

Two types of ANN's are usable in accordance with this invention: the self-organizing Kohonen network and the backpropagation network. The Kohonen method is applicable because the P-wave segments tend to fall into certain discrete categories. This indicated the use of a self-organizing neural network to solve this signal prediction problem. For instance, the self-organizing Kohonen network is used to cluster the various types of earthquake P-wave signals into various categories. The Kohonen network not only clusters the patterns into different groups, it also forms a useful topological ordering of the clusters according to an unsupervised feature extraction rule. Once the various P-segments are clustered into their appropriate categories, the category of a new event can be rapidly found and thereby extracted or can be used to predict the post-P-wave signal for that event. However, because the propagation of elastic waves through many different paths is a highly nonlinear process, the backpropagation network works better for this application. The backpropagation network is a more powerful tool than the Kohonen method for learning nonlinear mapping from the input to the output. In addition, a backpropagation neural network can more readily interpolate missing information.

Figure 3:
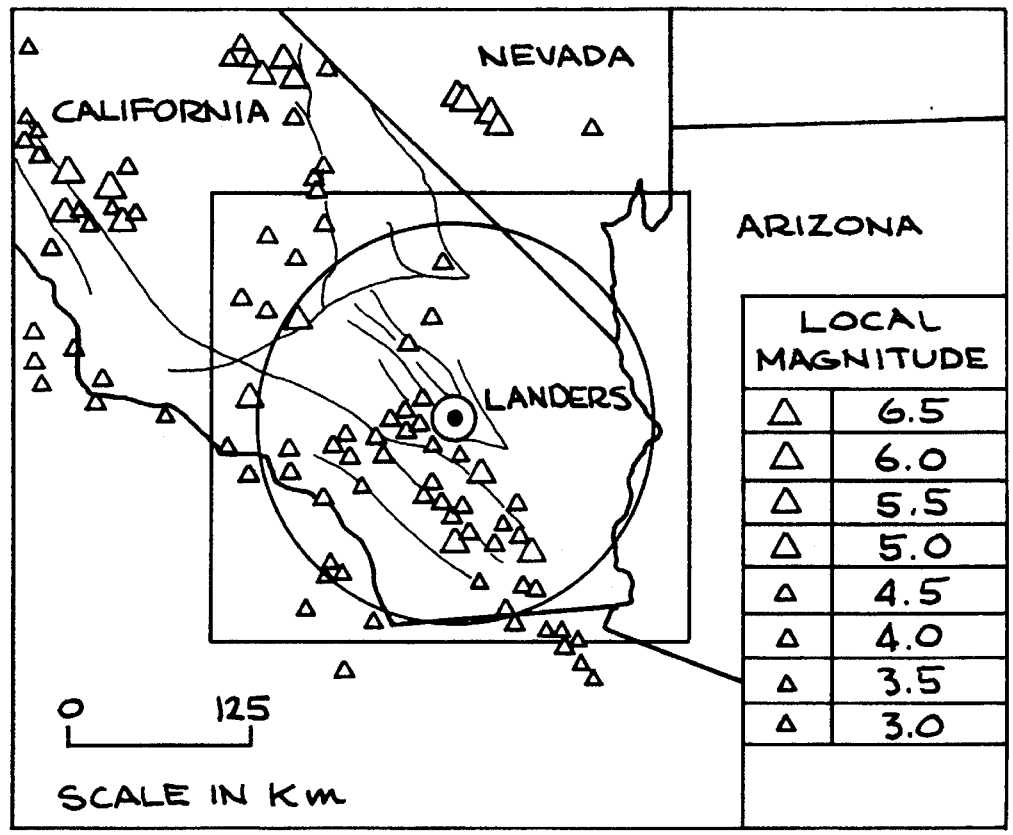
FIG. 3 shows the location and local magnitude of earthquakes that occurred in 1990 surrounding Landers, Calif.

The earthquakes used in this study were recorded by the Lawrence Livermore National Laboratory (LLNL) seismic observatory station at Landers, Calif. Landers is located at 34.39 latitude by −116.41 longitude. Using United States Geological Society (USGS) records, all earthquakes were located that occurred in the region surrounding Landers during the period from Jan. 1, 1990 to Dec. 31, 1990 as shown in FIG. 3. An area was defined by a window bounded by 32.2 to 36.5 latitude to −118.8 to −113.8 longitude. The window described above defines an area approximately 220 km in all directions from Landers.

Figure 4:
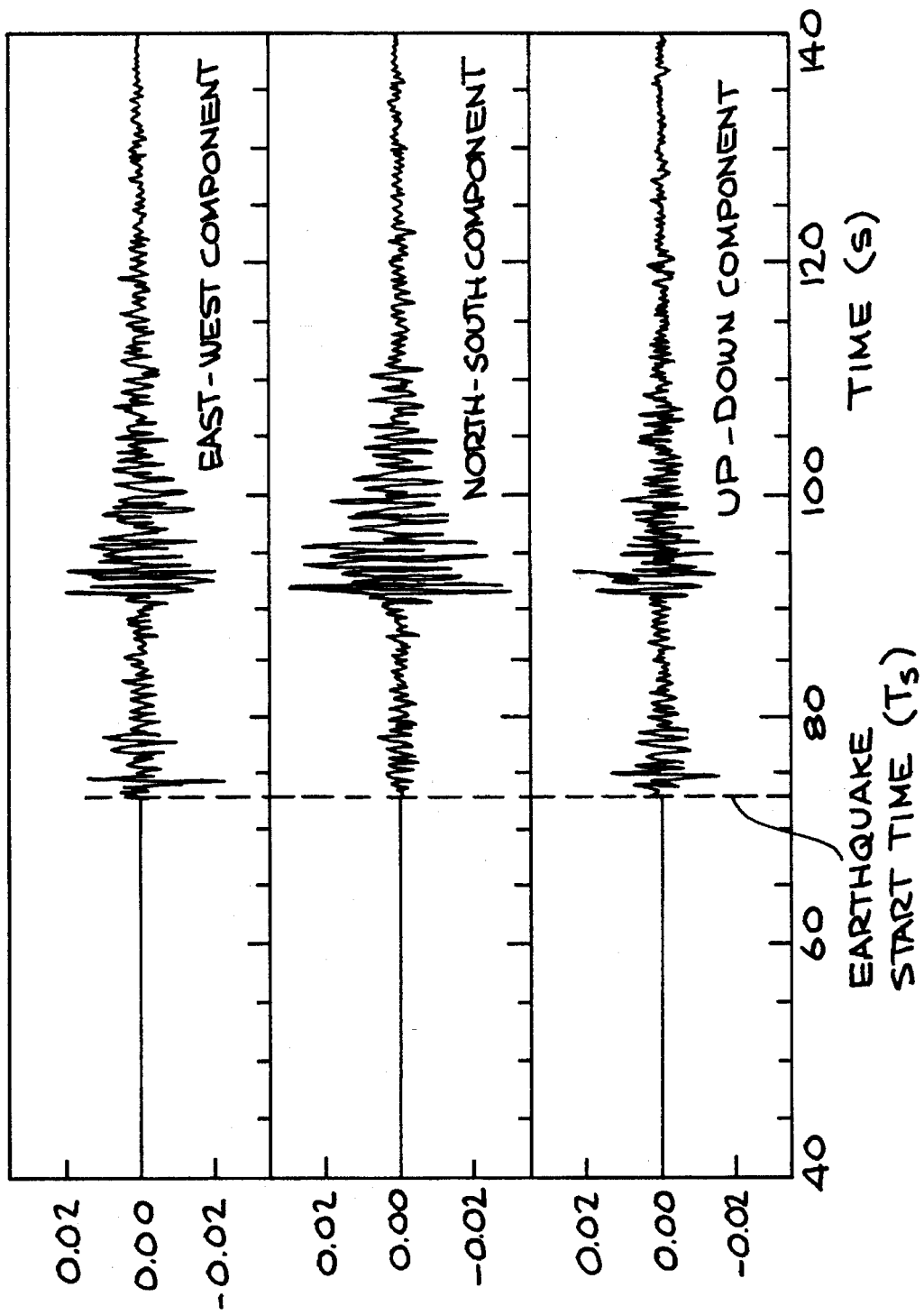
FIG. 4 is a typical seismograph.

This study focused on earthquakes at a distance of 20 to 200 km from Landers recording station. The criteria for using an earthquake candidate within this window were (1) that the radial distance from Landers to the epicenter be greater than 20 km, and (2) that the local magnitude divided by the log of the radial distance be greater that 1.5. This ensured that earthquakes that were too small to reach Landers with any significant shaking would be removed. It also eliminated earthquakes occurring too close to Landers to be able to provide any useful warning time. This was a reasonable bias since a training data set for the neural network should consist of a set of earthquake recordings with significant shaking and good signal-to-noise ratio. Earthquake recordings that saturated the seismograph or contained dropouts or glitches were also removed. This resulted in a set of 51 earthquakes. A typical seismograph recording of three-component spatial motion is seen in FIG. 4 which shows typical seismograph recording at Landers recording station showing east-west, north-south, and up-down motion. This particular event had a local magnitude of 4.2 and originated approximately 178 km from Landers.

Figure 5A:
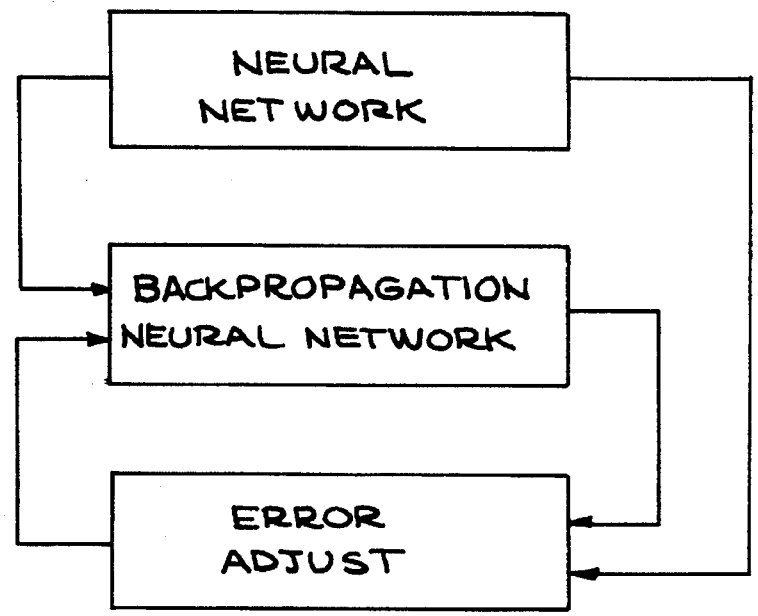
FIG. 5A depicts the training phase of a neural network.
Figure 5B:
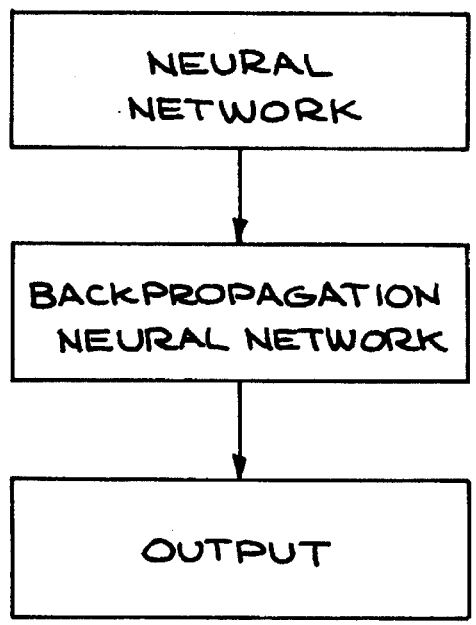
FIG. 5B depicts the testing phase of a neural network.

A representation of the system is shown in FIG. 5A. During the training phase, the neural network is presented with the first seconds of a seismogram. The output of the network is compared to the later part of the seismogram to see how well they match. The internal weights of the network are adjusted to produce a better match (or reduction in error). This process is repeated until the error is reduced to the level where the network has "learned" the non-linear relationship between the input and output. During the testing phase, as shown in FIG. 5B, the neural network is presented with only the first seconds of a previously unseen seismogram. The neural network will provide the later portion of the seismogram whose accuracy is determined by the quantity and quality of the example training set. The neural network was trained to learn the relationship between the first few seconds of and the later portion of 50 different seismograms. The neural network could then use the first few seconds of a previously unseen seismogram to predict the later portion of the seismogram.

A three-component seismogram is represented by a signal:

$$c(t) = \{c_e(t), c_n(t), c_v(t)\}, \qquad (6)$$

where t represents time, and $c_e(t)$, $c_n(t)$, and $c_v(t)$ represent east, north, and vertical channels, respectively. The first step in preparing the data was to filter each component with a third-order Butterworth bandpass filter with corner frequencies at 0.5 and 3 Hz. Good yield estimation can be achieved in this frequency range. Next, an envelope function e(n) of the data was performed for each component using a Hilbert transform. The envelope is defined by, $$e(n) = \sqrt{c^2(n) + y^2(n)}, \qquad (7)$$

where c(n) is stored in computer memory and is the discrete time signal representing c(t) while y(n) is the Hilbert transform of c(n). A three-component incoherent beamforming of these three signals produced the earthquake target signals used in this study. Each resulting time series signal was visually examined, and the time of first arrival of each earthquake was marked and is denoted by Ts.

Figure 6:
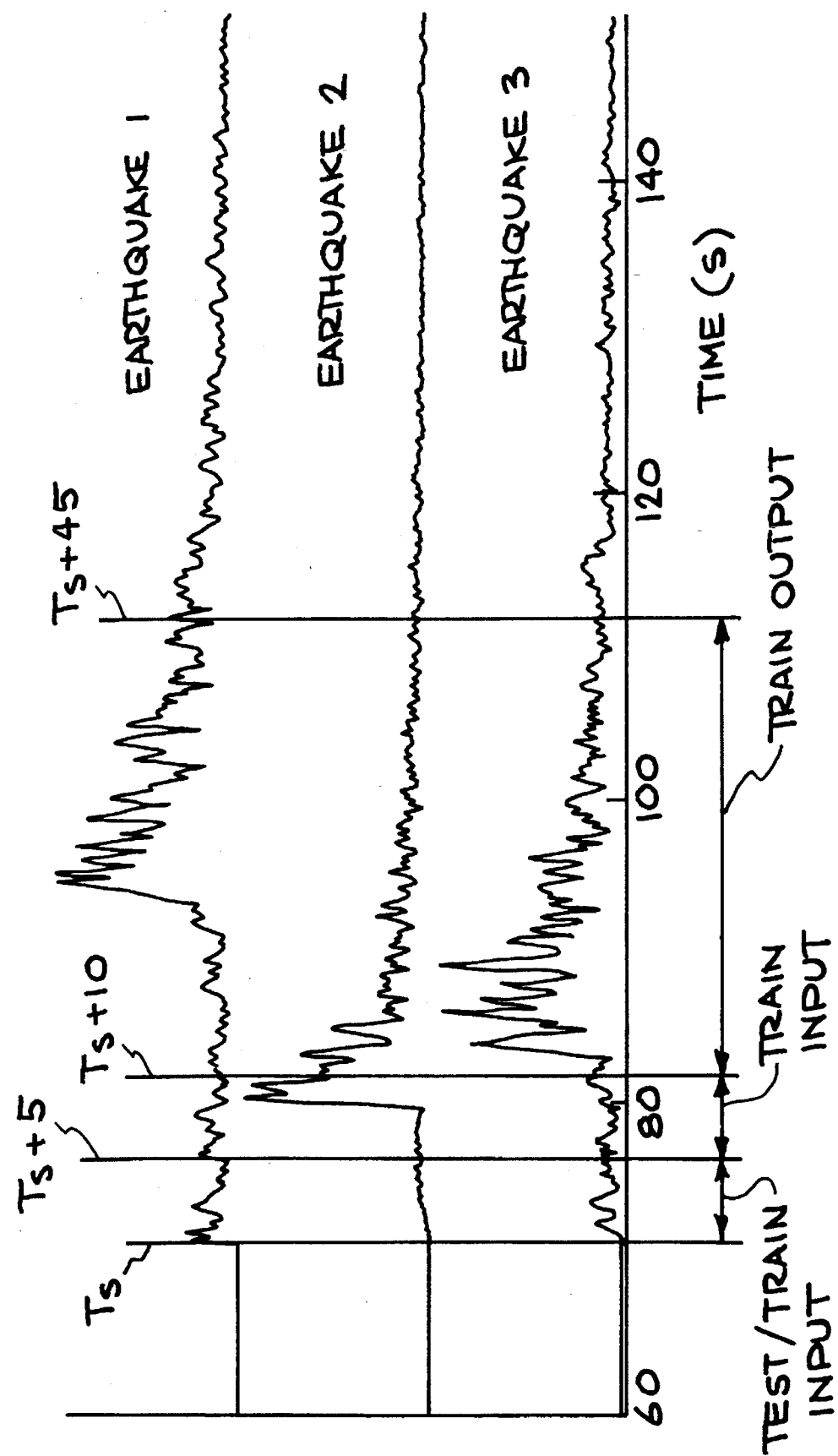
FIG. 6 illustrates three pre-processed earthquake signals showing their respective training input and output time spans.

Two time spans within these signals are defined. The first determines the input to the ANN and the second determines the output of the ANN. For this study, the input time span began at T, with a 5-sec duration, or began at T, + 5 also with a 5-sec time span. The output time span began at $T_g+5$ with a 40-sec duration. This provided the ANN with seismogram information from the first or second 5 sec of signal and forced the ANN to predict the later arriving 40-sec portion of the seismogram. FIG. 6 illustrates three pre-processed earthquake signals showing their respective training input and output time spans.

Figure 7A:
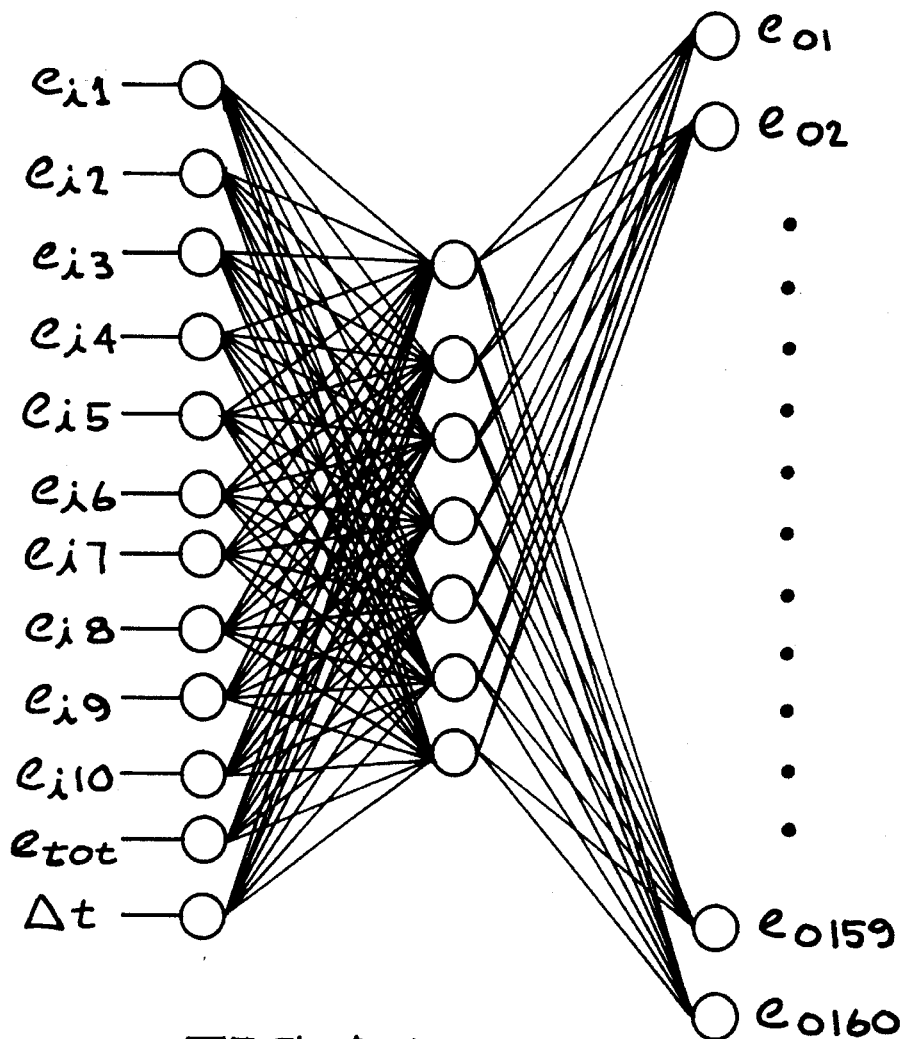
FIG. 7A shows ANN architecture.
Figure 7B:
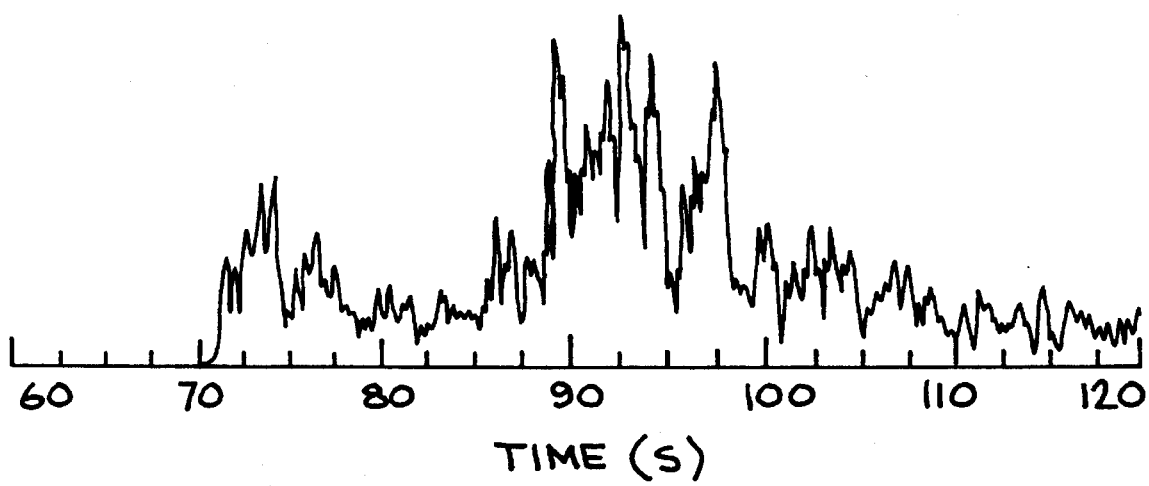
FIG. 7B shows a seismogram.
Figure 7C:
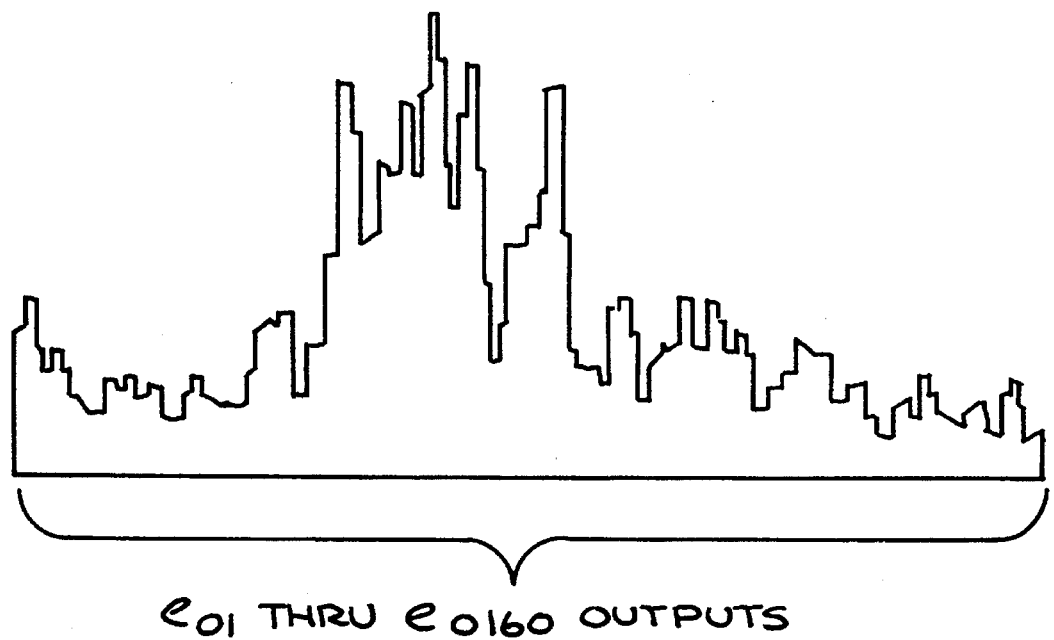
FIG. 7C shows the seismogram of FIG. 7b sub-divided into segments.

The ANN architecture used in this shady is illustrated in FIG. 7A–C. It has 12 inputs, one hidden layer consisting of 7 hidden units, and 160 outputs. Except for one input, (which will be described shortly) all inputs and outputs to the ANN consist of measurements taken from the envelope-detected seismograms described earlier. These measurements are referred to as energy E defined as, $$E = \int_{T_1}^{T_2} x^2(t) \frac{d}{dt} . \quad (8)$$

For the output, there are 160 energy measurements. The 40-sec output time span is subdivided into 160, 0.25-sec segments. Each segment represents an output of the ANN whose $T_1$ and $T_2$ in equation (8) are the endpoints of the segment. The resulting output is defined as the target signal for the given earthquake. An accurate prediction of the target signal is the system's best possible depiction of the true earthquake signal, since the target signal is what is used for training the network. The target signal provides a very good representation of the earthquake signal.

For the input, there are 11 energy measurements. The 5-sec input time span is subdivided into 10, 0.5-sec segments. Each segment represents an input to the ANN whose $T_1$ and $T_2$ in equation (8) are the endpoints of the segment. The eleventh energy input is defined as the total energy from $T_g$ to the end of the input time span or, where $T_1$ equals Ts, and $T_2$ equals either $T_g+5$ or $T_g+10$. The twelfth input is the time span from $T_g$ to $T_g+5$ or $T_g+10$. The two different inputs are presented to the ANN as separate input during training. For 50 training examples, the ANN is trained with the first and second 5 sec of the signal, both having a prediction goal of the 5 to 45-sec time interval of the earthquake signal, resulting in a set of 100 training examples. Earthquake signals are subdivided into segments. Energy measurements for each segment define the input and output of the neural network shown.

The above approach can be generalized for any number or size of input and output time spans and may have a total number of segments limited only by the sample rate of the seismic signal. The above configuration was chosen for two reasons. First, since the distance between the epicenter of the earthquakes and the seismograph ranged from 20 to over 200 km, a complete seismogram profile 5 sec after the arrival of the first energy would provide useful warning time in almost all instances. Secondly, excessively large dimensional input can overwhelm an ANN-based estimator when the number of examples used to train the ANN is small when compared to the total number of input elements. When the number of input elements are large, the number of weights in the network is also large. In general, it is recommended that the ratio of the number of examples to the number of weights be 10 or higher in order to maximize the generalization capabilities of the network. In this experiment, 100 examples and 12 input elements were used.

The "leave one out" strategy was used in each training session for the ANN. Given the set of 51 earthquake signals to be tested, the ANN was trained using all the signals in the set except the one to be tested. This forced the ANN to learn the correlation between the first-arrival energy and the profile of the later arriving seismogram signal. The first seconds of the removed earthquake signal were then input to the trained network to produce the earthquake prediction profile. The ANN was trained with backpropagation learning for a multilayer feed-forward neural network using the conjugate gradient method. The Hestenes-Stiefel formula for numerical one-dimensional minimization of line search procedure was used in the backpropagation algorithm.

As described earlier, the ANN was trained with two different types of input. All energy inputs were normalized, where for example, a given set of energy values represented by $E = (E_1, E_2, \ldots, E_n)$, has a maximum ($E_{max}$) and a minimum ($E_{min}$) value was located in E. A set of normalized input y is created where, for k= (0, 1, 2, ... n), $$y_k = \frac{E_k - E_{min}}{E_{max} - E_{min}} . \quad (9)$$

All input and output values were preprocessed as described earlier and normalized as shown in equation (9) (energy values were first converted to log10).

The network was trained 51 separate times, each with one input set removed during training. The removed data was then fed forward through the trained network, producing the 40-sec earthquake prediction profile. Although the ANN was trained with the first 10 sec of the set of representative earthquakes, it is important to note that in the feedforward mode, only the first 5 sec of the signal are presented to the trained ANN. In this manner, the system will provide a complete earthquake profile 5 sec after the start of the seismic activity.

Each neural network output was compared to the true seismograph signal in two ways. First the correlation coefficient was calculated for the ANN output signal and the true earthquake signal. Second, the normalized rms error between the ANN output and the true output was calculated.

In addition to the neural network experiment, a simple average of each set of 50 earthquakes was prepared; these averages were used to compare with the ANN results. Again, the correlation coefficient was calculated for the average of the earthquakes and the earthquake as well as the normalized rms error between the earthquake and the average of the earthquakes.

Figure 8:
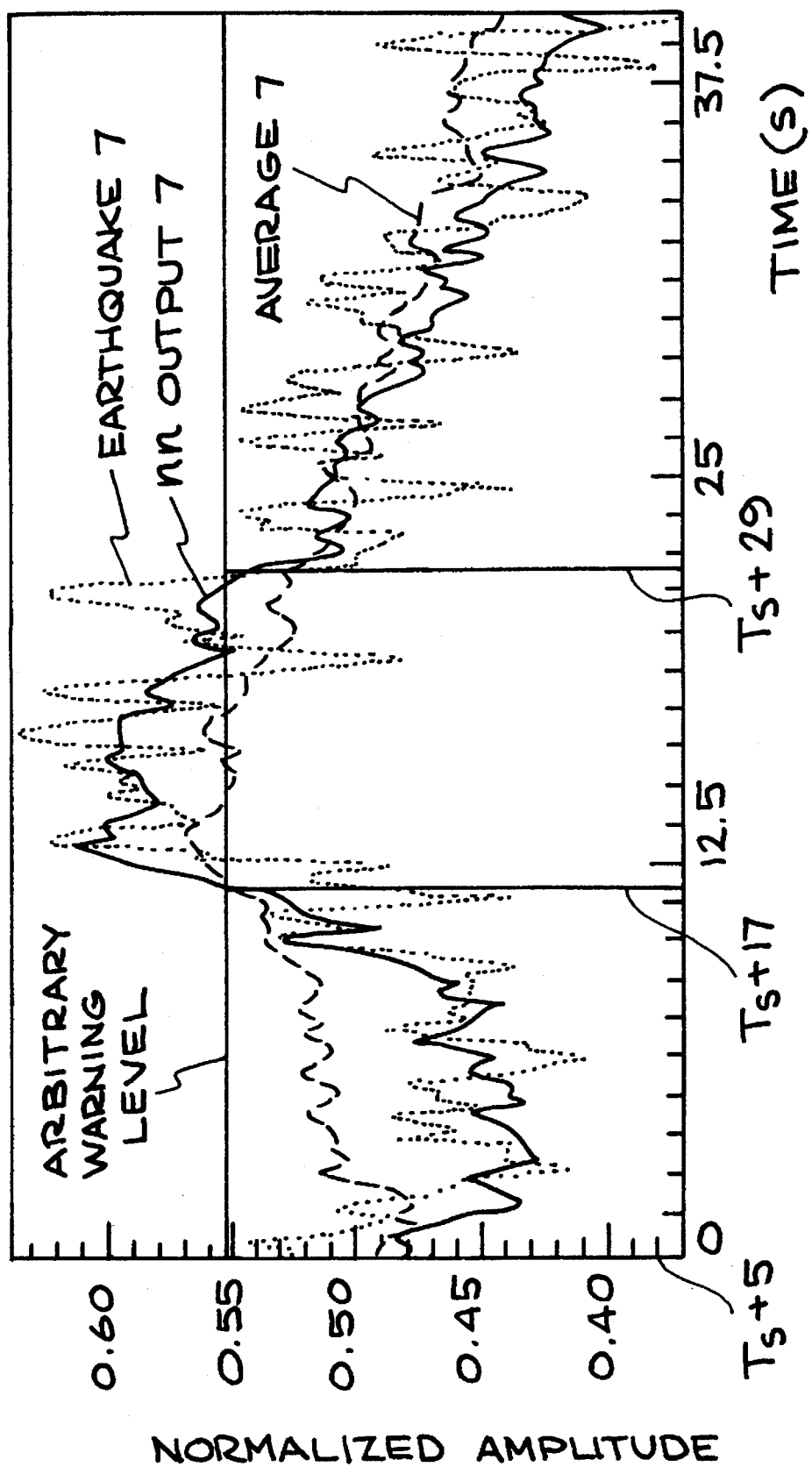
FIG. 8 illustrates an ANN's output, target, and average signals for an earthquake.

The ANN's output, target, and the average signals for one of the earthquakes (each earthquake was assigned an index, in this case 7) are illustrated in FIG. 8. A simple detection scheme using an arbitrary warning level is also shown. The time at which the signal rises above this level indicates the amount of warning time before the onset of Severe shaking. The span of time at which the signal is above the level indicates the duration of the hazard. The integral of the signal during the time that the signal is above the level could be scaled to provide a magnitude estimate for the earthquake. This information is available instantaneously after only 5 sec of ground motion. For the warning level shown in FIG. 8, the ANN predicts that the warning level will be exceeded in about 12 sec and that the hazard will last for −12 sec. The true earthquake signal bears out the prediction quite well for this example. The earthquake in FIG. 8 occurred −145 km from the Landers recording station and had a USGS local magnitude of 3.6. It should also be noted that the average signal is a poor representation of the true earthquake in this case. Five seconds after the onset of the earthquake, the output of the system is shown (nn output 7). Superimposed are the target earthquake signal (earthquake 7) and the average of the 50 earthquake signals excluding earthquake 7 (average 7). An arbitrary warning level shows the neural network to be a good predictor for this example.

The most crucial measure of the quality of any warning system is the false alarm rate. This includes missed hazards as well as exaggerated hazards. This approach, along with a well designed decision analysis procedure, offers great promise in lowering false alarm rates. Conventional warning algorithms make their decisions based on a very short time span of the seismic signal. This often leads to false alarms due to glitches or noise. Making such a system less sensitive leads to missed hazards. The neural network can avoid this problem since it has the characteristics of many complete earthquake signals stored in its internal weights. This "learned" information will provide an earthquake profile. This profile will then be subject to a robust decision analysis algorithm which will minimize false alarm problems.

The correlation coefficient $C_c$ for the neural net signal $n(t)$ and the earthquake signal $c(t)$ in FIG. 8 is 0.85. To find $C_c$, these two signals are represented by vectors $n$ and $c$ consisting of their discrete time signal amplitudes, which are stored in computer memory. First, the mean value is subtracted from each element in each respective vector. The correlation coefficient is then given by, $$C_c = \frac{n \cdot c}{(\|c\|)(\|n\|)} \quad (10)$$

The correlation coefficient will provide an indication of how well the shape of the two signals match. For example, a $C_c$ of 1 indicates a perfect match. The $C_c$ for all 51 pairs of earthquake and neural network signals is plotted in FIG. 9A.

Figure 9A:
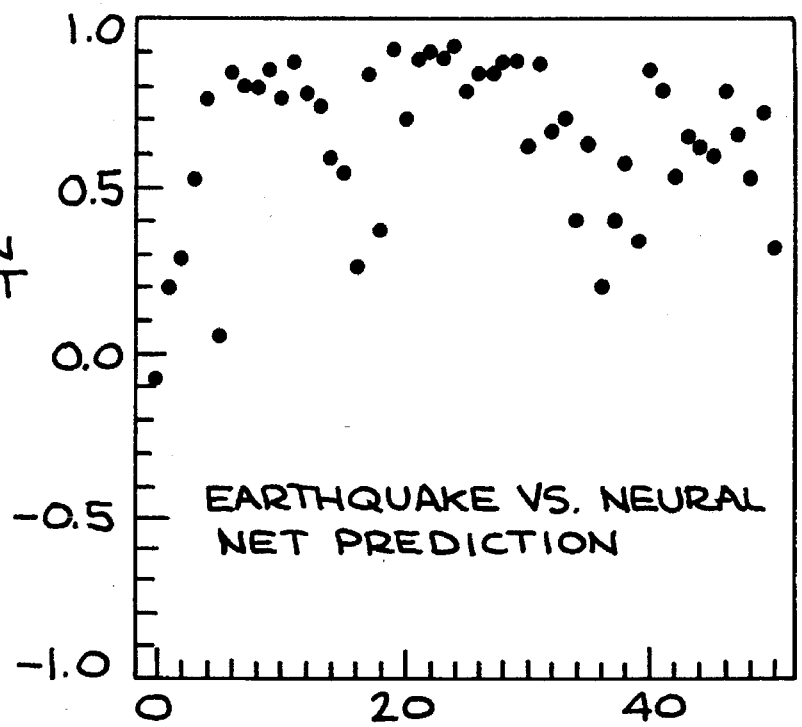
FIG. 9A is a plot of the correlation coefficient for 51 earthquake signal/ANN output signal pairs.
Figure 9:
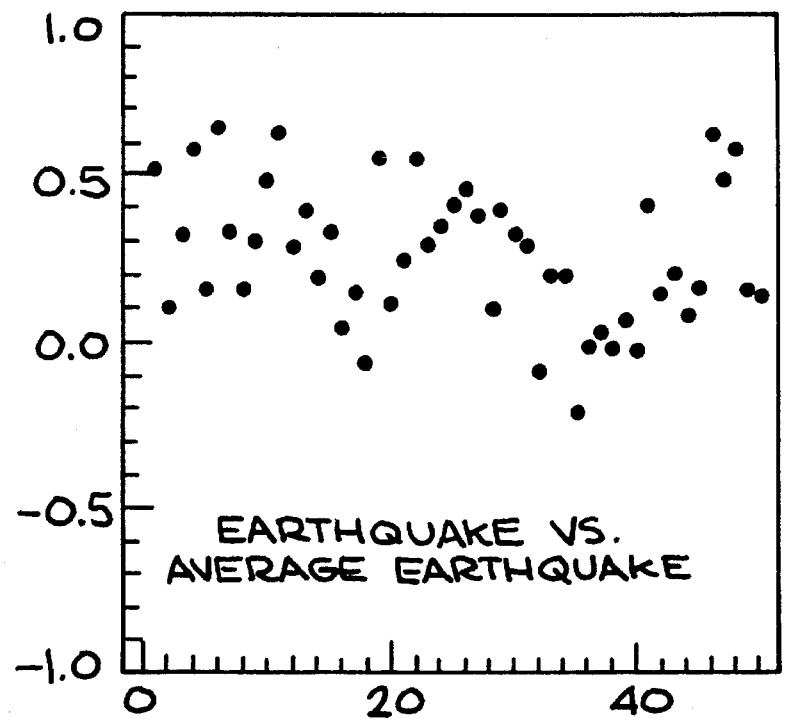
FIG. 9B is a plot of the correlation coefficient for 51 earthquake signal/average earthquake signal pairs.

The correlation coefficient $C_c$ for 51 earthquake signal/ANN output signal pairs is shown in FIG. 9A. Likewise, the correlation coefficient $C_c$ for 51 earthquake signal/average earthquake signal pairs is shown in FIG. 9B. The ANN system provides better results than the simple average of the earthquake training set. For any given training set of 50 earthquake signals, the average signal is represented by, $$a(t) = \frac{1}{50} \sum_{i=1}^{50} c_i(t). \quad (11)$$

In FIG. 9B, $C_c$ is plotted for each earthquake signal, but $a(t)$ (vector $a$) is used to replace $n$ in equation (10). This clearly shows that the neural network has learned to predict the overall shape of the emerging earthquake signal far better than the simple average of the training set.

Producing a representative shape of the seismic signal is a useful property for the system since it provides onset and duration times for impending hazardous ground motion. Also, identification of a specific elastic wave can provide the epicentral distance of the earthquake from the detection site. Another important property that the system must have is the ability to provide accurate magnitude predictions. As suggested earlier, one way to accomplish this is to take the integral of all or a portion of the output signal, which can then be scaled to produce a magnitude estimate. However, to quantify the results, the rms error was calculated between $c(t)$ and $n(t)$ and between $c(t)$ and $a(t)$. For any general finite time series signal $e(t)$ bounded by $T_1$ and $T_2$, the rms value is defined as a constant value that is defined as the square root of the mean of the square of the signal, or $$e_{rms} = \sqrt{\frac{1}{T} \int_{T_1}^{T_2} e^2(t) dt} \quad (12)$$

Using equation (12), the normalized rms error between a signal $e(t)$ and an estimate of the signal $e(t)$ is given by, $$error_{rms} = \sqrt{\int_{T_1}^{T_2} \frac{[(\hat{e}(t) - e(t))]^2}{e^2(t)} dt}, \quad (13)$$

The rms error between each target earthquake and its respective neural network prediction was calculated by substituting $e(t)$ with $c(t)$ and $e(t)$ with $n(t)$ in equation (13).

Figure 10A:
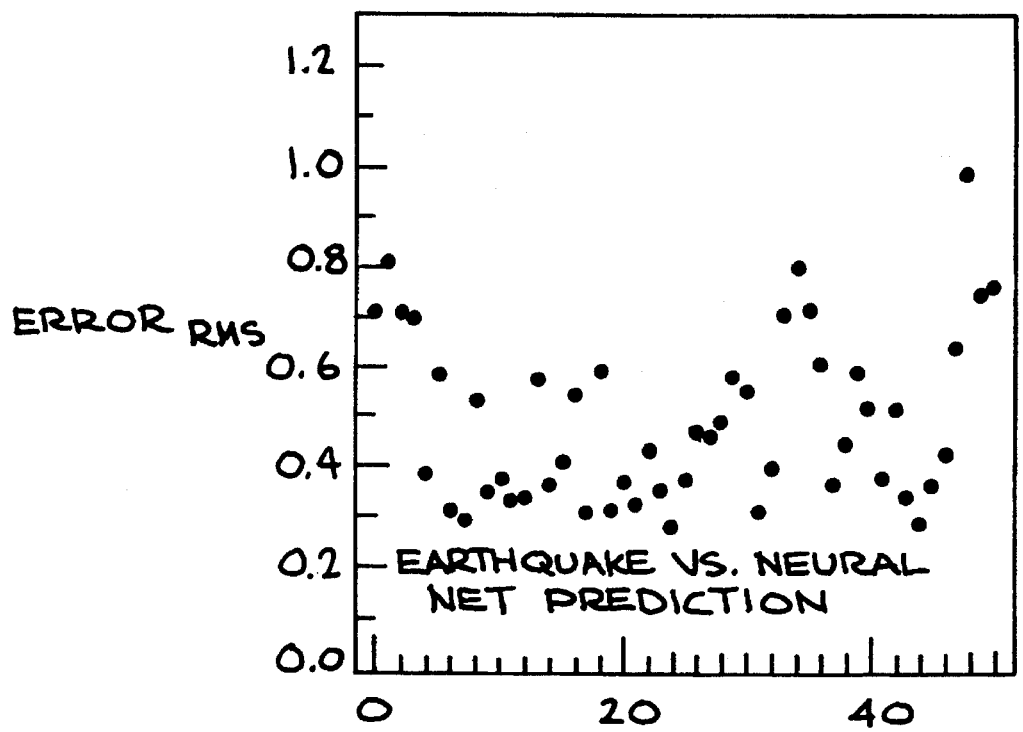
FIG. 10A shows the rms error for 51 earthquake signal/ANN output signal pairs.

The value of $error_{rms}$ will quantify how well the integrated given earthquake signal match the integrated ANN prediction signal. For example, the earthquake illustrated in FIG. 8 had a $error_{rms}$ value of 0.3. In other words, the average power of the two signals differed by 30%. A perfect match would yield a $error_{rms}$ value of zero. The $error_{rms}$ values for all 51 pairs of earthquake and neural network output signals are plotted in FIG. 10A.

Figure 10B:
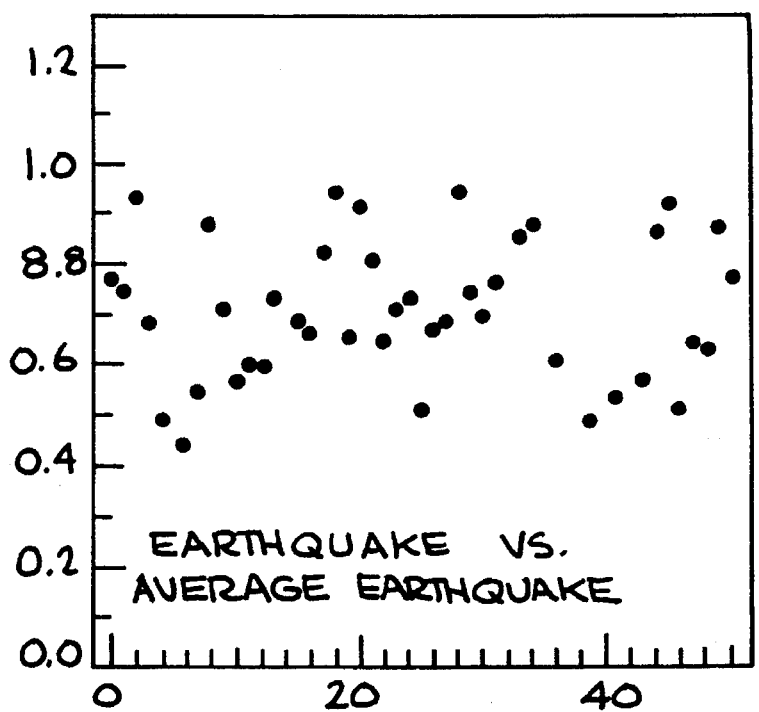
FIG. 10B shows the rms error for 51 earthquake signal/average earthquake signal pairs.

The rms error between each target earthquake and the average of all 51 earthquakes was calculated by substituting $e(t)$ again with $c(t)$ and $e(t)$ with $a(t)$ in equation (13). In FIG. 10B, 51 of the $error_{rms}$ calculations using the target signal and the average signal are plotted. The comparison between 10a and 10b clearly shows that the ANN is learning more than the average total energy value of the input training set and that magnitude predictions using the neural-network-based system would provide better results than using the simple average.

One embodiment of a working system is as follows:

Step 1. Provide three accelerometers, one for each component of ground motion, in the range of ±2 g or some range appropriate to monitor strong ground motion. Install them tightly coupled to the earth, oriented orthogonal to each other. (i.e. one pointing East-West, one pointing North-South, and one pointing Up-Down)

Step 2. Power the accelerometers appropriately (most likely by battery), and provide signal and power conditioning such that their output voltage is a linear representation ground acceleration (i.e. As the ground acceleration becomes more positive/negative, the output voltage proportionally becomes more positive/negative).

Step 3. Transmit, via wire or wireless link, the analog voltage data as per some threshold criteria (i.e. If the ground accelerates above 0.5 g, the transmitter turns on for 5 minutes).

Step 4. The receiving end of the link should feed the three component signals through and anti-aliasing filter to an analog to digital A/D converter which will submit the digitized sensor data to a computer.

Step 5. The computer will have installed a set of neural network weights which have been stored from being previously trained using a large set of representative earthquakes. The computer will also have the necessary preprocessing software, as well as the postprocessing decision analysis software.

Step 6. The computer will then take the data, and perform preprocessing filtering and present an input to the stored neural network.

Step 7. The neural network will feedforward the data and immediately produce an estimate of the profile of a complete earthquake.

Step 8. The profile will be updated continuously as the signal continues to come in, until hazardous conditions have abated.

Step 9. If the output exceeds some criteria deemed hazardous, such as an arbitrary magnitude equivalent to 5.0 on the Richter scale, early warning could be provided to personnel or systems as needed. For example, automatic gas shutoff valves could be activated. A estimate of how long until the heavier shaking arrives could be provided to emergency personnel, as well as the duration of the heavier shaking.

Figure 11:
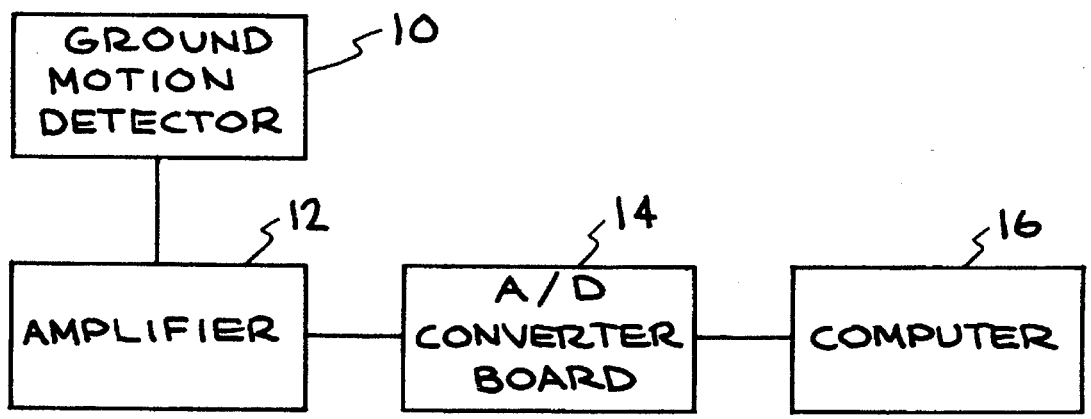
FIG. 11 shows an embodiment of a real-time neural network earthquake profile predictor.

An embodiment of a working system is shown in block diagram form in FIG. 11, and comprises at least one ground motion detector 10, with three mutually orthogonal components, where each component is identical and may consist of seismometers, accelerometers and geophones. The ground motion detector 10 may be battery powered and produces an output signal. An amplifier 12 receives the output signal and produces a three channel amplified analog signal, which is then transmitted to an analog-to-digital (A-D) converter board 14 having at least three channels electrically configured to receive the three channel amplified analog signal. A computer 16 is provided to house the A-D converter board 14 The computer contains an event detection algorithm which preprocesses an incoming seismic signal to produce a seismogram having time series and frequency information. The seismogram is then fed forward by an artificial neural network to produce a complete earthquake profile.

Generally, a backpropagation learning algorithm is operated as follows:

Step 1. Initialize the weights in the network by randomly setting them to small positive and negative numbers.

Step 2. Present the input and its associated desired output. For example, time series or frequency measurements are presented as input and the earthquake profile is presented as the desired output.

Step 3. Compute the output of the network, i.e., the network's estimate of the desired earthquake profile.

Step 4. Compute the error for the network output and update the weights to minimize the error.

Step 5. Using the resulting output as the new input, repeat steps 2 through 5 until the error is sufficiently small. Repeat the entire process for each input in the training set.

Changes and modifications in the specifically described embodiments can be carried out without departing from the scope of the invention, which is intended to be limited by the scope of the appended claims.

We claim:

1. A method for predicting an earthquake profile, comprising: training an artificial neural network (ANN), comprising:

inputting at least one seismogram into the ANN to produce an output;

calculating an error between the ANN output and the seismogram;

adjusting the internal weights of the ANN to reduce the error in the calculating step;

repeating the preceding steps until the error is reduced to a level where the ANN can generalize sufficiently to produce an accurate output for a previously unseen input;

detecting an earthquake with three mutually orthogonal ground motion detectors which will produce real-time earthquake data;

transmitting into the ANN the real-time earthquake data from the three mutually orthogonal ground motion detectors; and feedforwarding the real-time earthquake data in the ANN to produce a predicted earthquake profile.

2. The method of claim 1, wherein the inputting step includes producing the seismogram by filtering and envelope detecting a seismic signal to provide time series and frequency information.

3. The method of claim 1, wherein the step of inputting at least one seismogram into the ANN to produce an output includes inputting a plurality of seismograms into an ANN selected from a group consisting of a self-organizing Kohonen network and a backpropagation network.

4. The method of claim 1, wherein the step of inputting at least one seismogram includes inputting at least one seismogram stored in a United States Geological Society database.

5. The method of claim 1, wherein the step of detecting an earthquake includes tightly coupling to the earth the three mutually orthogonal ground motion detectors.

6. The method of claim 1, wherein the step of detecting an earthquake includes configuring the three mutually orthogonal ground motion detectors to monitor ground motion in the range of plus or minus 2 g.

7. The method of claim 1, wherein the step of detecting an earthquake includes powering the detectors by battery.

8. The method of claim 1, wherein the step of detecting an earthquake includes power conditioning the real-time earthquake data to provide a linear representation of ground acceleration.

9. The method of claim 1, wherein the step of transmitting earthquake data includes transmitting earthquake data when ground acceleration exceeds a preset threshold.

10. The method of claim 1, wherein the step of transmitting earthquake data includes transmitting earthquake data when ground acceleration exceeds a preset threshold of 0.5 g.

11. The method of claim 1, wherein the step of transmitting earthquake data includes transmitting earthquake data for a preset time period when ground acceleration exceeds a preset threshold.

12. The method of claim 1, wherein the step of transmitting earthquake data includes transmitting earthquake data for a preset time period of 5 minutes when ground acceleration exceeds a preset threshold.

13. The method of claim 1, wherein the step of transmitting earthquake data includes feeding the real-time earthquake data through an anti-aliasing filter to produce a filtered signal, said filtered signal then being fed into an analog-to-digital converter which digitizes the filtered signal to produce a digitized signal, said digitized signal then being fed into the ANN which resides in a workstation computer.

14. The method of claim 1, wherein the step of transmitting earthquake data includes pre-processing the real-time earthquake data in a computer to produce pre-processed data, said pre-processed data then being fed into the ANN which resides in the computer.

15. The method of claim 1, wherein the step of transmitting earthquake data includes filtering the real-time earthquake data with a third-order Butterworth bandpass filter having corner frequencies at 0.5 Hz and 3 Hz to produce filtered preprocessed data, performing an envelope function by using a Hilbert transform on said filtered pre-processed data to produce enveloped data, and feeding the enveloped data into the ANN which resides in a computer.

16. The method of claim 1, wherein the step of feedforwarding the real-time earthquake data in the ANN includes continuously updating the profile as the signal continues to be detected.

17. The method of claim 1, further comprising the step of activating a warning system if the magnitude of the profile produced in the feedforwarding step exceeds a preset threshold.

18. The method of claim 1, further comprising the step of activating a warning system if the magnitude of the profile produced in the feedforwarding step exceeds a preset threshold of 5.0 on the Richter scale.

19. The method of claim 1, further comprising the step of activating automatic shutoff valves on gas lines if the magnitude of the profile produced in the feedforwarding step exceeds a preset threshold.

20. The method of claim 1, further comprising the step of activating automatic shutoff of electrical lines if the magnitude of the profile produced in the feedforwarding step exceeds a preset threshold.

21. The method of claim 1, further comprising the step of activating audible warnings if the magnitude of the profile produced in the feedforwarding step exceeds a preset threshold.

22. The method of claim 1, wherein the step of inputting at least one seismogram into the ANN to produce an output includes inputting a plurality of seismograms into a self-organizing Kohonen network which clusters the seismograms into groups and orders the seismograms according to an unsupervised feature extraction rule.

23. The method of claim 1, wherein the step of detecting an earthquake with three mutually orthogonal ground motion detectors includes detecting an earthquake with an east-west detector, a north-south detector and an up-down detector.

24. The method of claim 1, wherein the step of training an ANN includes performing the inputting step with the same seismogram at least 10 times before inputting a new seismogram.

25. The method of claim 1, wherein the step of training an ANN includes training the ANN with backpropagation learning for a multilayer feed-forward neural network using a conjugate gradient method.

26. The method of claim 1, wherein the step of feedforwarding the real-time earthquake data includes calculating the integral of a portion of the predicted earthquake profile to produce a magnitude estimate.

27. An apparatus for predicting an earthquake profile, comprising:

at least one ground motion detector, comprising three mutually orthogonal components, wherein each component is identical and is selected from a group consisting of seismometers, accelerometers and geophones, said detector being battery powered and producing an output signal;

an amplifier to receive said output signal and produce a three channel amplified analog signal;

an analog-to-digital (A-D) converter board comprising at least three channels electrically configured to receive said three channel amplified analog signal;

a computer to house said A-D converter board, said computer comprising an event detection algorithm, wherein an incoming seismic signal is preprocessed to produce a seismogram having time series and frequency information; and an artificial neural network which feeds forward said seismogram to produce a complete earthquake profile.

* * * * *